United States Patent
Piazza

[11] Patent Number: 5,333,719
[45] Date of Patent: Aug. 2, 1994

[54] DEVICE FOR POSITIONING NEBULIZER PUMPS DESTINED TO BE SCREWED TO LIQUID CONTAINERS

[75] Inventor: Gastone Piazza, Marmirolo, Italy

[73] Assignee: Alfa Costruzioni Meccaniche S.p.A., Mantova, Italy

[21] Appl. No.: 69,284

[22] Filed: May 28, 1993

[30] Foreign Application Priority Data

Sep. 24, 1992 [IT] Italy ............ PR92 A 000041

[51] Int. Cl.$^5$ .................................... B65G 47/24
[52] U.S. Cl. .................................. 198/399; 198/396
[58] Field of Search ........... 198/382, 392, 394, 396, 198/399, 406

[56] References Cited

U.S. PATENT DOCUMENTS

| | | | |
|---|---|---|---|
| 2,633,971 | 4/1953 | Albertoli et al. | 198/396 |
| 2,781,885 | 2/1957 | Taylor | 198/396 X |
| 3,277,997 | 10/1966 | Hannah . | |
| 3,306,425 | 2/1967 | Rapp, Jr. et al. | 198/399 |
| 3,682,292 | 8/1972 | Drew | 198/399 |
| 3,876,064 | 4/1975 | Morton | 198/396 X |
| 4,014,460 | 3/1977 | Bryan, Jr. | 198/396 X |
| 4,095,688 | 6/1978 | Ionescu | 198/399 |
| 4,610,345 | 9/1986 | Spreen et al. | 198/392 |

FOREIGN PATENT DOCUMENTS 1416875 12/1975 United Kingdom ......... B65G 47/24

Primary Examiner—James R. Bidwell
Attorney, Agent, or Firm—Darby & Darby

[57] ABSTRACT

The invention relates to the field of filling plants for liquid containers, which containers can be closed with nebulizer pumps. The device which is object of the invention positions the pumps with their collecting tubes directed upwards by use of a conveyor belt at which unloading point is provided a motorized roller positioned in such a way as to create a slit which allows the pumps to pass through if positioned correctly, while the motorized roller acts only on the collecting tube of the pumps which are not correctly positioned.

6 Claims, 1 Drawing Sheet

DEVICE FOR POSITIONING NEBULIZER PUMPS DESTINED TO BE SCREWED TO LIQUID CONTAINERS

BACKGROUND OF THE INVENTION

The invention relates to a device for positioning nebulizer pumps destined to be screwed to liquid containers.

The prior art includes spray pumps or nebulizers equipped with a collection tube about as long as the container into which it is inserted. The pump also is equipped with a ring collar to screw and block the said pump to the container.

The prior art also includes feeding machines to send the pumps to capping machines which insert the tube into the filled container and screw the collar up until the bottle is closed.

The feeding machines are equipped, with among other things, a rotating conical surface bearing at its extremity, a plurality of radial channels into which the pumps are inserted, all positioned with the collection tube turned upwards.

The device which is the object of the present invention aims to solve the problem of positioning of the pumps in such a way that they can reach the radial channels of the conical rotating surface with their collection tubes turned upwards.

The feeding of the pumps to the conical surface, according to prior art teaching, is made by means of a collecting elevator in a large box in which the pumps are loosely deposited.

The elevator unloads the pumps on to a slide and during the journey on the said slide towards the conical surface, the pumps are positioned, tending to turn tube-upwards by themselves due to the greater weight of the pump with respect to the weight of the collecting tube.

Obviously this system is very hit-and-miss, with a considerable number of pumps reaching the channelling zone in wrong positions, creating an obstacle to their correct feeding.

A principal aim of the present invention is to provide a device which is positioned in the unloading zone of the elevator, aimed at positioning the pumps before they fall on to the conical surface or in any case aimed at making sure that on falling they are correctly positioned.

This aim is fully attained by the device, object of the present invention, which is characterised in the claims which follow.

BRIEF DESCRIPTION OF THE DRAWINGS

The device for positioning pumps will now be described with reference to the accompanying drawings in which the device is schematically represented in a preferred embodiment, where more specifically.

DESCRIPTION OF THE PREFERRED EMBODIMENT

Figure 2:
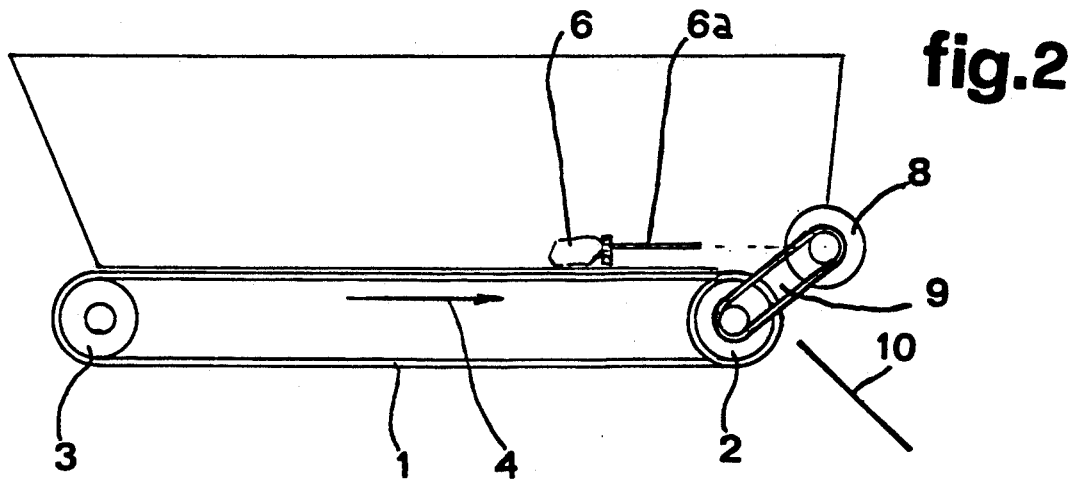
FIG. 2 shows the device in lateral view.
Figure 1:
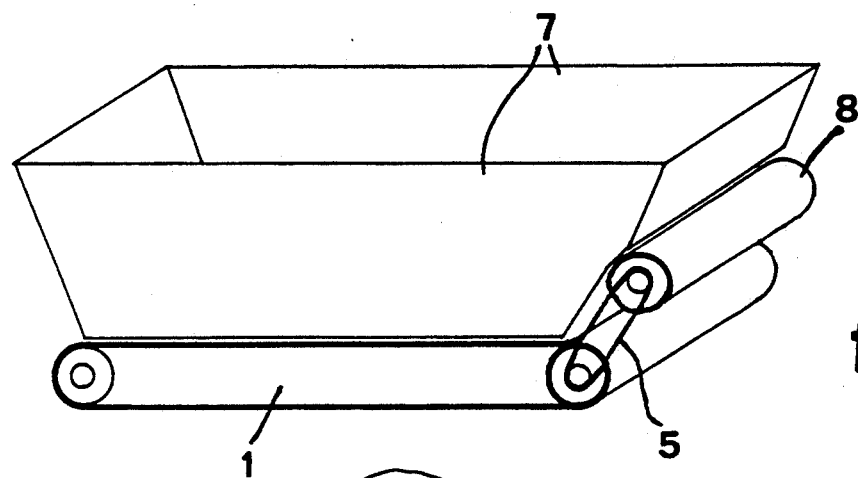
FIG. 1 shows the device in perspective view.
Figure 3:
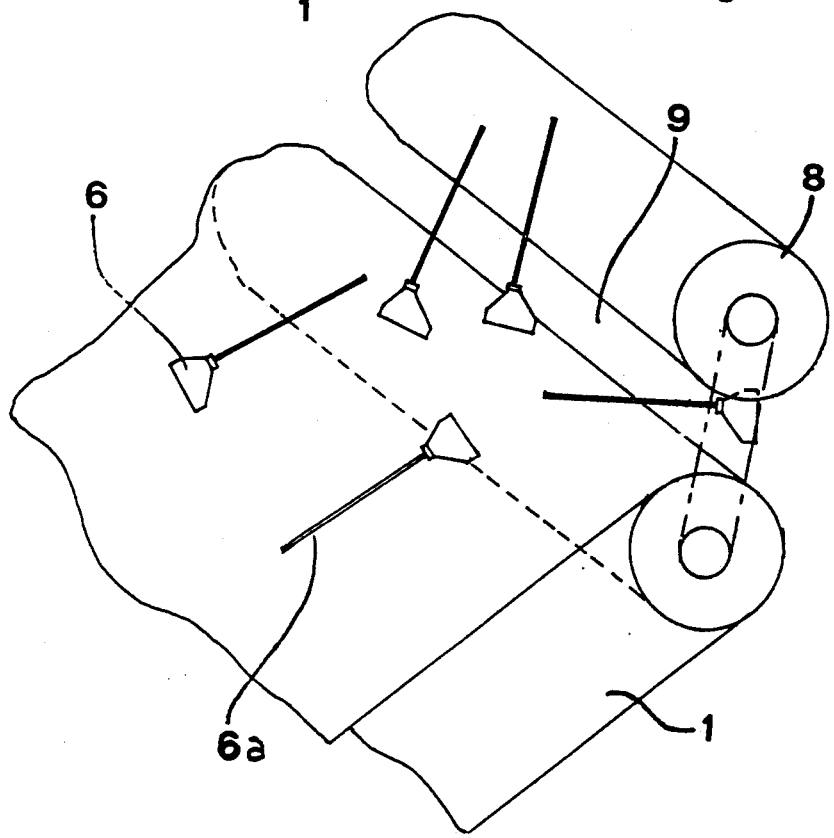
FIG. 3 partially shows the device with some pumps in a positioning phase.

With reference to the drawings, 1 denotes a conveyor belt, substantially formed by a belt in rubber or PVC material which is wound around two drums 2 and 3, one of which is motorised by a motor variator (not illustrated), which moves the belt according to the direction shown by the arrow 4.

Above the conveyor belt 1 a terminal part of an elevator (not illustrated) is positioned, which elevator collects the pumps 6 from a box and deposits them loosely on to the conveyor belt 1, which conveyor belt 1 is equipped with sides 7. In front of the conveyor belt 1, in the unloading zone of the said conveyor belt 1, a motorized roller 8 is positioned, between a chain or belt 5 which receives the movement of the drum 2.

The roller 8 axis is parallel to the axis of the drum 2 and at a height which is such as to leave a slit 9 through which the pump will pass; furthermore, the height of the slit 9 must be such that the collecting tube 6a of the pump is at a height from the conveyor belt 1 which coincides with or is higher than the rotation axis of the roller 8.

The tangential velocities of the roller 8 and the conveyor belt 1 are the same.

The roller 8 performs the positioning task of the device.

There are three possibilities of positioning for the pump on the conveyor belt 1:

the pump is positioned with its collecting tube 6a disposed parallel to the conveyor belt 1 and behind the pump, with respect to the advancement direction of the pump, which is the correct position;

the pump is positioned with its collecting tube 6a disposed transversally to the conveyor belt 1, an incorrect but acceptable position;

the pump is in a position where its collecting tube 6a is disposed parallel to the conveyor belt 1 but in front of the pump with respect to the advancement direction of the pump, which is an incorrect position;

in the first two cases the pump will pass through the slit 9 without any intervention on the part of the positioning device with regard to the pump 6 positioning.

Also in the second case, the positioning is acceptable since it can be corrected, thanks to the fact that the greater weight of the pump 6 with respect to the collecting tube 6a favours a correct positioning during the pump's sliding along the conical underlying surface, denoted by 10 and of known type.

In the third case the collecting tube 6a will strike against the upper roller and will be lifted up until it tips completely over, performing a 180 degree rotation in the process, and then will be disposed practically as in the above-described first or second cases.

Obviously there might occur positions which are intermediate to the limit positions which have been described above, that is a position with the collecting tube 6a disposed obliquely with respect to the conveyor belt 1, but also in this case the upper roller 8 will bring the pump into one of the three positions described above, and subsequently the pump will be brought into one of the two acceptable positions.

Obviously, the upper roller 8 also has the function of avoiding the pumps' falling on top of each other during the falling phase, and thus has the role of controlling the flow of the pumps towards the overlying rotating conical surface.

What is claimed:

1. A device for positioning nebulizer pumps to be screwed to liquid containers comprising:
   a conveyor belt being wound around a pair of drums one of said drums being rotatably driven by a motor, a plurality of pumps being loosely deposited on said conveyor belt;

a roller having a rotational axis that is parallel to a rotational axis of the drums, said roller being disposed in a position spaced above and forward of the drums, said roller being disposed adjacent to one of said drums, in an unloading position of the pumps, such that a slit opening is disposed between said roller and said one of said drums to permit the pumps to pass through said slit opening when said pump is disposed on said conveyor belt in an acceptable orientation and, when said pump is disposed on said conveyor belt in an unacceptable orientation, to cause said pump to interfere with said roller and be lifted up and tipped over into an acceptable orientation.

2. The device according to claim 1, wherein a tangential velocities of the drum and the conveyor belt are the same.

3. The device according to claim 1, wherein a vertical distance between the roller and the drum of the conveyor belt is substantially such that a collecting tube of the pump which is on the conveyor belt is practically at or above the rotation axis of the roller.

4. The device according to claim 1, wherein the roller is motorized by means of a kinematic system which derives its movement from one of the drums of the conveyor belt.

5. The device according to claim 1, wherein said roller is a single roller.

6. The device according to claim 5, wherein said conveyor belt is a single conveyor belt.

* * * * *